(No Model.) 3 Sheets—Sheet 1.
C. V. PUGH.
MEAT CUTTER.
No. 457,212. Patented Aug. 4, 1891.
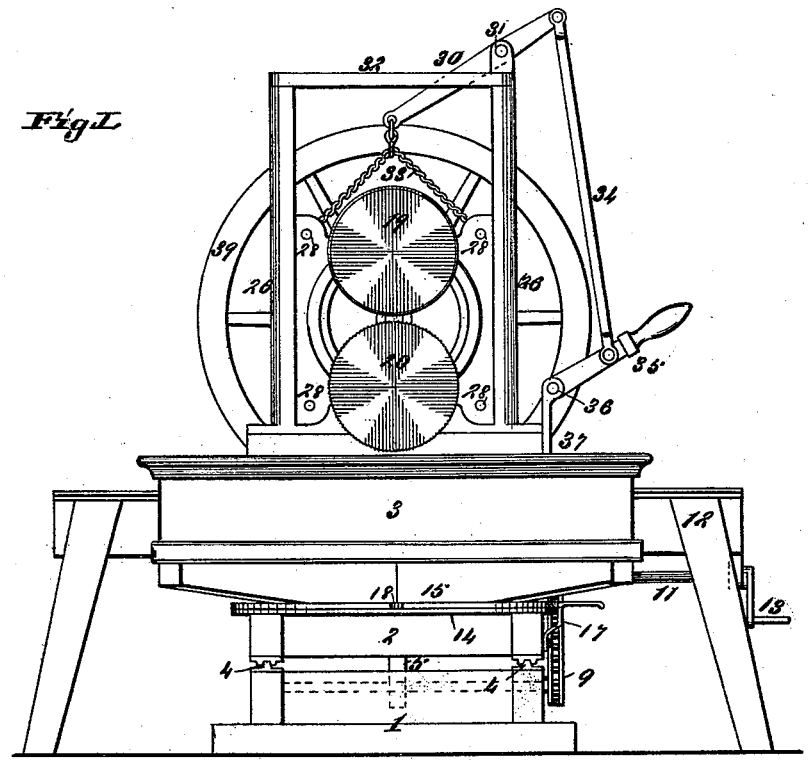
Fig.I.
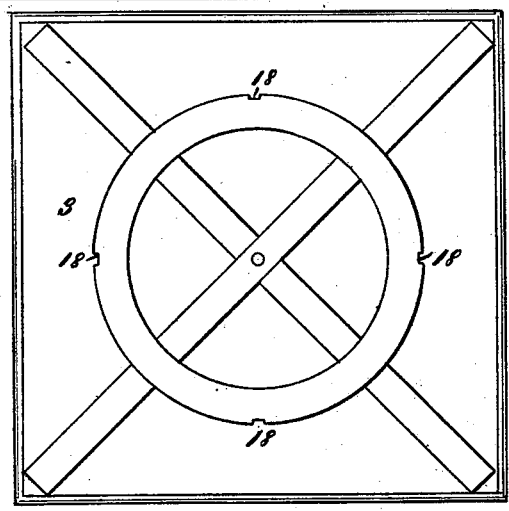
Fig.II.
Attest:
E. Arthur
S. H. Knight
Inventor:
Cortez V. Pugh
By Knight Bro's
attys (No Model.)  3 Sheets—Sheet 2.
C. V. PUGH.
MEAT CUTTER.
No. 457,212. Patented Aug. 4, 1891.
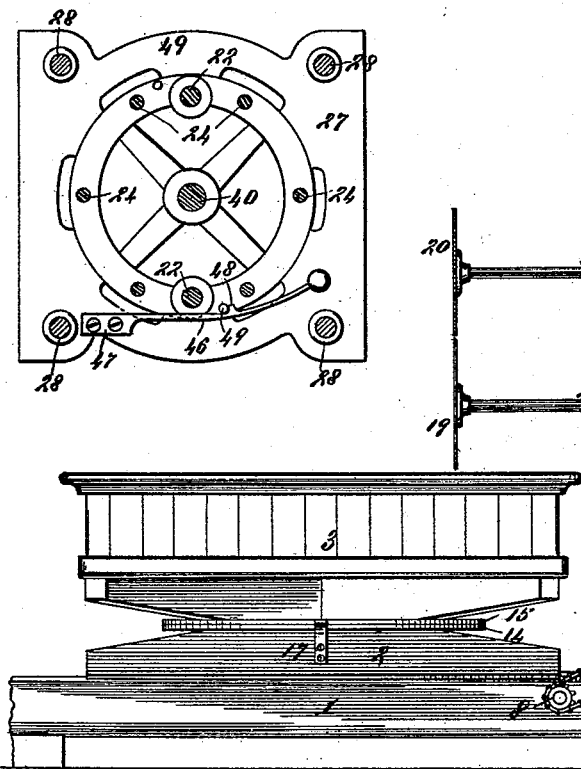
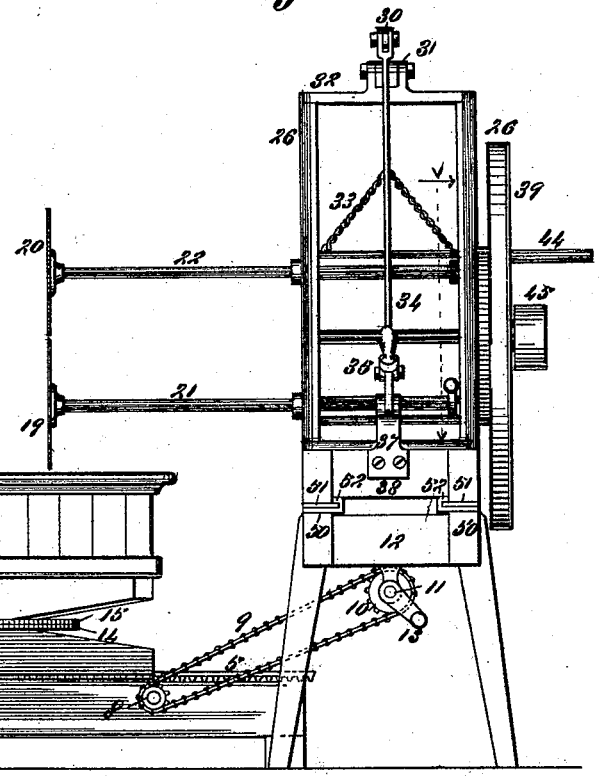
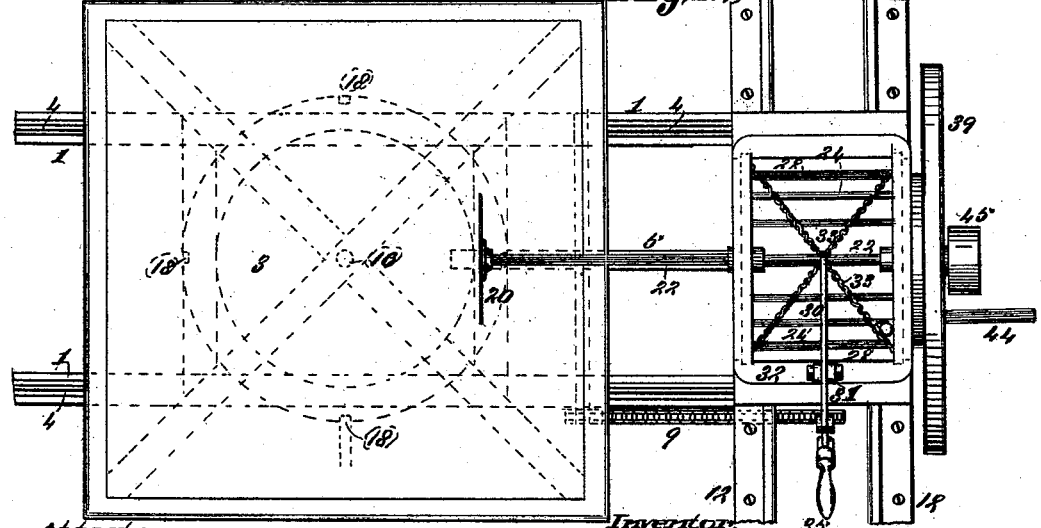

(No Model.) 3 Sheets—Sheet 3.
C. V. PUGH.
MEAT CUTTER.
No. 457,212. Patented Aug. 4, 1891.
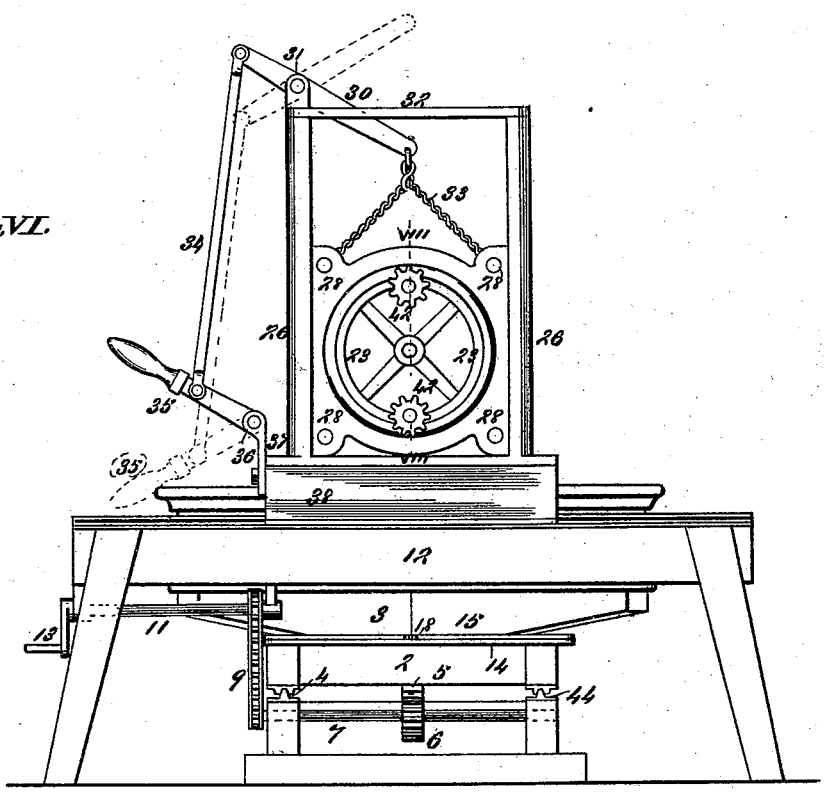
Fig. VI.
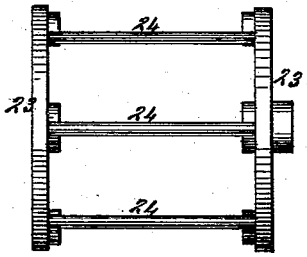
Fig. VII.
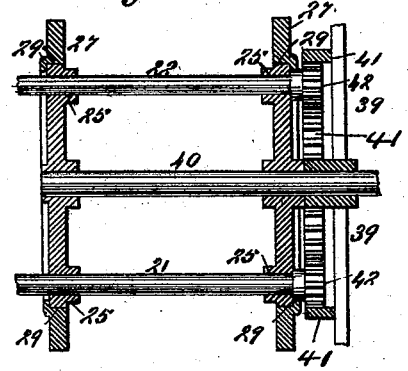
Fig. VIII.
Attest:
E. Arthur
S. H. Knight
Inventor:
Cortez V. Pugh
By Knight Bro's
att'ys

UNITED STATES PATENT OFFICE.

CORTEZ V. PUGH, OF BOWLING GREEN, MISSOURI, ASSIGNOR OF FIVE-SIXTHS TO DAVID L. CALDWELL, ELIJAH ROBINSON, JOHN FARRELL, JEFF T. McCUNE, AND CHARLES E. PORTER, ALL OF SAME PLACE.

MEAT-CUTTER.

SPECIFICATION forming part of Letters Patent No. 457,212, dated August 4, 1891.

Application filed August 22, 1890. Serial No. 362,775. (No model.)

*To all whom it may concern:*

Be it known that I, CORTEZ V. PUGH, of Bowling Green, in the county of Pike and State of Missouri, have invented a certain new and useful Improvement in Meat-Cutters, of which the following is a full, clear, and exact description, reference being had to the accompanying drawings, forming part of this specification.

My invention relates to a machine for cutting meat, and is more particularly intended for cutting meat as it is retailed.

My invention consists in features of novelty hereinafter fully described, and pointed out in the claims.

Figure I is an end elevation of my machine. Fig. II is a bottom view of the turn-table upon which the meat to be cut is placed. Fig. III is a side elevation of the machine. Fig. IV is a top or plan view. Fig. V is a vertical section taken on line V V, Fig. III, and looking in the direction of the arrow. Fig. VI is an end view, the opposite end to that shown in Fig. I being illustrated. Fig. VII is a side elevation of the spindle-carrying reel removed, the spindles and power-shaft not being shown. Fig. VIII is a vertical section of the reel and its supporting-frame, taken on line VIII VIII, Fig. VI.

Referring to the drawings, 1 represents a bed-plate or frame supporting a carriage 2, upon which is mounted a turn-table 3, that receives the meat to be cut. Rails 4 are placed between the carriage and bed-plate, as shown in Figs. I and VI, to permit the carriage to be moved back and forth along the bed-plate to move the table toward and away from the cutters. As a means of thus moving the carriage, I have shown a rack 5, secured to the carriage preferably at or near its center, as shown in Figs. III and IV, which is engaged by a pinion 6 (see Fig. VI) on a shaft 7, journaled in the side of the bed-plate and having on one end a chain-wheel 8, (see Fig. III,) over which passes a chain belt 9, which also passes around or over a chain-wheel 10 on a shaft 11, journaled to the supporting-frame 12 of the cutter-operating mechanism. The shaft 11 is provided with a crank 13, by which it may be turned in the proper direction to move the carriage (through means of the described connection) back and forth over the bed-plate 1.

I prefer to mount the table rotatably on the carriage, and for this purpose employ an annular plate or ring 14, secured to the carriage, and upon which rests a similar ring or plate 15, secured to the turn-table, the parts being connected at their centers by means of a pivot-pin or king-bolt 16, as shown by dotted lines in Fig. IV. It will thus be seen that the table will be free to turn on the carriage to bring pieces of meat placed and secured on different parts of the table beneath the cutters. The table may be held to its adjustment by means of a spring-catch 17, (see Figs. I and III,) secured to the carriage and adapted to engage in notches 18 in the ring or plate 15. (See Fig. II.)

The cutters consist of a circular knife 19 and a saw 20. The knife is secured to a mandrel 21 and the saw is secured to a mandrel 22. The cutters extend over the table, as shown in Fig. III.

To provide means for presenting the saw and knife independently, their mandrels are journaled in a cage or reel consisting of annular rings or plates 23, connected together by rods 24. (See Figs. VII and VIII.) The mandrels pass through the rings or plates 23, as shown at 25, Fig. VIII. The reel is held in a vertically-sliding head or frame placed between guide-posts 26, and consisting of plates 27, connected by rods 28. Plates 27, as shown at 29, Fig. VIII, are recessed to receive the rings or plates 23 of the reel, so that the reel is free to turn while being held from end, vertical, or lateral movement by the plates 27.

As stated, the sliding head or frame consisting of the plates 27 and rods 28 is free to move vertically within the guide-posts 26, and it is thus moved by means of a lever 30, pivoted at 31 to a cap 32, located on top of the post 26, the inner end of the lever being made fast by a chain 33, or otherwise, to the sliding head or frame and the outer end of the lever being connected by a rod 34 to a hand-lever 35, pivoted at 36 to a bracket 37, secured to a carriage or slide 38, upon which the posts 26 are mounted. It will be seen that by moving the hand-lever 35 from the position shown in full lines, Fig. VI, to the position shown by dotted lines the sliding head or frame will be raised, carrying with it the reel and the cutters, and thus the cutters can be raised and lowered at will.

Power is applied to the mandrels 21 and 22 through means of a fly-wheel 39, mounted rigidly on a shaft 40, which also preferably passes loosely through the reel, as shown in Fig. VIII. The fly-wheel is removed or not. (Shown in Fig. VI.) It is provided with a ring 41, having cogs or teeth on its inner surface which mesh into or engage pinions 42, secured to the spindles 22 and 21. The fly-wheel may be turned to impart motion to the cutters, through means of the mandrels and the described connection between the mandrels and the fly-wheel, by means of a handle 44, (see Figs. III and IV,) or the fly-wheel may be turned through means of a suitable motor and a belt forming a connection between the motor and a pulley 45 on the shaft 40. Only part of the fly-wheel is shown in Fig. VIII, the remainder being broken away. The mandrels 21 and 22 pass through the ends or disks of the reel, as stated, but turn freely therein. It will be seen that as the fly-wheel is turned there will be a tendency on the part of the reel to turn with the wheel; but this is avoided by means of a spring-catch 46, secured at 47 (see Fig. V) to the reel-carriage or supporting-frame, the spring having a projection 48, which is engaged by projections or pins 49 on one of the ends of the reel, and thus the rotary movement of the reel is avoided until the catch 46 is depressed to permit the projection 49, which is bearing against the projection 48, to pass the latter, and then the reel will turn with the fly-wheel until the next projection 49 engages the projection 48, when the reel will be stopped again.

The carriage 38 is mounted on a supporting-frame or table 12, so as to slide lengthwise of the latter and permit the cutters to be moved in a direction transversely to the direction of movement of the turn-table 3 and carriage 2 on the bed-plate 1. I prefer to place plates 50 and 51 between the supporting-frame 12 and the carriage 38, as shown in Fig. III, the plates 50 being secured to the supporting-frame and the plates 51 to the carriage, and the inner edges of the plates 50 being turned up and over the inner edges of the plates 51, as shown at 52, Fig. III, so that the carriage is held from vertical or lateral movement on the supporting-frame while being allowed to move endwise.

The operation is as follows: The piece of meat to be cut is placed upon the table 3 and held from movement thereon. The table is then adjusted by sliding the carriage and turning the table on the carriage to the proper position for the cutters to act upon the meat. The operator then grasps the handle 44 of the fly-wheel by one hand and the lever 35 with the other hand, and by turning the fly-wheel imparts a rotary movement to the cutters, the cutters being in the position shown in Fig. III, with the knife beneath the saw. As the cutters revolve, he forces the carriage 38 along the supporting-frame 12, causing the knife 19 to cut the flesh portion of the piece of meat. As the knife comes in contact with a bone, he lifts the cutters by applying a downward pressure upon the lever 35, and as the bone is passed allows the cutters to fall again to their normal position. When the piece of meat has thus been traversed by the knife, the operator places one hand (the hand by which he held the lever 35) against the free end of the spring-catch 46, and by the pressure on the catch forces the projection 48 out of contact with the projection 49, at the same time continuing to turn the fly-wheel. As soon as the reel is released from the spring-catch, it starts to turn around its axis, bringing the saw 20 down next to the table and elevating the knife 19, and just as the saw reaches its lower position the next projection 49 on the reel comes in contact with the projection on the spring-catch 46 and the turning of the reel ceases. The operator then turning the fly-wheel with one hand and with the other hand on the lever 35 moves the carriage 38 back to its first position, causing the saw to traverse the piece of meat and sever or cut the bone. When this piece of meat has been cut off, he turns the crank 13, moving the carriage 2 and table 3 inwardly the distance of the desired thickness of the next piece of meat, and then the operation just described of turning, adjusting, and moving the cutters is repeated, and thus the operation goes on continuously.

With a machine thus constructed meat can be easily, quickly, and neatly cut up as it is retailed to the trade, and the machine would also be useful in hotels and institutions using a quantity of meat.

I claim as my invention—

1. In a meat-cutter, the combination of a suitable supporting-table, a saw and knife located over the table and provided with means for turning them, and mechanism for bringing the saw or knife into using position, for the purpose set forth.

2. In a meat-cutter, the combination of a suitable table, a knife and saw located over the table on suitable mandrels, a fly-wheel, working connection between the fly-wheel and the mandrels, and means for bringing the knife or saw into using position at will, as specified.

3. In a meat-cutter, the combination of a suitable table, a knife and saw located over the table and mounted on suitable mandrels, a reel supporting said mandrels, a catch for holding the reel in position to admit either the knife or saw to be used at will, and means for turning the knife and saw, substantially as set forth.

4. In a meat-cutter, the combination of a suitable table, a knife and saw located over the table on suitable mandrels, means for turning the saw and knife, and a movable reel supporting the knife and saw, and by which either the knife or saw can be brought into using position, substantially as set forth.

5. In a meat-cutter, the combination of a suitable table for supporting the meat, rotary cutters located over the table and mounted on suitable mandrels, means for turning the cutters, and means for supporting the cutters, by which either may be brought into using position, consisting of a reel movably supported, projections on the reel, and a spring-catch having a projection, substantially as set forth.

6. In a meat-cutter, the combination of a suitable supporting-table, rotary cutters mounted on suitable mandrels, and means for adjusting and turning the cutters, consisting of a movable reel, a catch for holding the reel to its adjustment, pinions on said mandrels, a fly-wheel, and a ring on said fly-wheel, provided with cogs engaging said pinions, said mandrels being supported in said reel, substantially as and for the purpose set forth.

7. In a meat-cutter, the combination of a horizontally-adjustable meat-supporting table, a vertically-adjustable cutter located over the table, and operating mechanism for driving the rotary cutter and shifting the table relatively to and beneath the knives, substantially as and for the purpose set forth.

8. In a meat-cutter, the combination of a suitable supporting-table, a rotary cutter, a vertically-movable frame supporting said cutter, and a carriage supporting said frame and adjustable horizontally and relatively to the table, substantially as and for the purpose set forth.

9. In a meat-cutter, the combination of a suitable table, a rotary cutter mounted over the table, a vertically-movable frame supporting said cutter, means for moving the frame, consisting of a suitable lever and connection between the lever and frame, and a sliding carriage upon which said frame is mounted, said carriage being movable independently of the table, substantially as and for the purpose set forth.

10. In a meat-cutter, the combination of a suitable table, a rotary cutter located over the table, and a sliding carriage supporting said cutter and movable relatively to the table, substantially as and for the purpose set forth.

11. In a meat-cutter, the combination of a suitable table, a rotary knife and saw located over the table, means for presenting said knife and saw independently, a vertically-movable frame supporting said knife and saw, and a horizontally-movable carriage supporting said frame, substantially as and for the purpose set forth.

CORTEZ V. PUGH.

In presence of—
C. C. EDWARDS,
J. E. CASH.